US012742939B2

(12) United States Patent
Haase et al.

(10) Patent No.: US 12,742,939 B2
(45) Date of Patent: Sep. 22, 2026

(54) MOLDED OPTICAL CONNECTORS WITH ZERO-DRAFT MECHANICAL ALIGNMENT FEATURES

(71) Applicant: 3M INNOVATIVE PROPERTIES COMPANY, St. Paul, MN (US)

(72) Inventors: Michael A. Haase, St. Paul, MN (US); Nicholas A. Lee, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 272 days.

(21) Appl. No.: 18/288,664

(22) PCT Filed: Apr. 22, 2022

(86) PCT No.: PCT/IB2022/053787
§ 371 (c)(1),
(2) Date: Oct. 27, 2023

(87) PCT Pub. No.: WO2022/234381
PCT Pub. Date: Nov. 10, 2022

(65) Prior Publication Data

US 2024/0201453 A1 Jun. 20, 2024

Related U.S. Application Data

(60) Provisional application No. 63/183,668, filed on May 4, 2021.

(51) Int. Cl.
*G02B 6/38* (2006.01)
*G02B 6/42* (2006.01)

(52) U.S. Cl.
CPC ......... *G02B 6/4214* (2013.01); *G02B 6/3881* (2013.01); *G02B 6/3885* (2013.01); *G02B 6/423* (2013.01); *G02B 6/4292* (2013.01)

(58) Field of Classification Search
CPC .. G02B 6/4214; G02B 6/3885; G02B 6/4292; G02B 6/4249; G02B 6/423;
(Continued)

(56) References Cited

U.S. PATENT DOCUMENTS

| | | | | |
|---|---|---|---|---|
| 10,746,942 B2 | 8/2020 | Haase et al. | | |
| 2013/0279860 A1* | 10/2013 | Hung | G02B 6/423 | 385/89 |

(Continued)

FOREIGN PATENT DOCUMENTS

| | | | |
|---|---|---|---|
| JP | 2020024268 A | 2/2020 | |
| WO | 9857208 W | 12/1998 | |

(Continued)

OTHER PUBLICATIONS

International Search report for PCT International Application No. PCT/IB2022/053787, mailed on Jul. 7, 2022, 4 pages.

*Primary Examiner* — Michelle R Connelly
(74) *Attorney, Agent, or Firm* — Jonathan L. Tolstedt

(57) ABSTRACT

A molded optical ferrule configured to mate with a mating component includes a top surface, a bottom surface opposite the top surface, and a plurality of side surfaces joining the top and bottom surfaces. The plurality of side surfaces includes a plurality of first side surface portions and a plurality of second side surface portions. The first side surface portions make a first angle greater than zero degrees with a thickness direction of the optical ferrule, the first angle assisting in the removal of the optical ferrule from a mold. The plurality of second side surface portions extends outwardly from the first side surface portions and makes a second angle less than the first angle with the thickness direction. When the optical ferrule mates with the mating
(Continued)

component, at least some of the second, but not the first, side surface portions contact corresponding side surface portions of the mating component.

15 Claims, 7 Drawing Sheets

(58) Field of Classification Search
CPC .. G02B 6/3853; G02B 6/3839; G02B 6/3881; G02B 6/3897; G02B 6/3826; G02B 6/4204; G02B 6/3652; G02B 6/383; G02B 6/4228; G02B 6/4246; G02B 6/3829
See application file for complete search history.

(56) References Cited

U.S. PATENT DOCUMENTS

| | | | |
|---|---|---|---|
| 2020/0209490 | A1 | 7/2020 | Childers |
| 2020/0301080 | A1 | 9/2020 | Haase et al. |

FOREIGN PATENT DOCUMENTS

| | | | | | |
|---|---|---|---|---|---|
| WO | 2014055226 | A1 | | 4/2014 | |
| WO | 2015094811 | A1 | | 6/2015 | |
| WO | 2017066135 | A1 | | 4/2017 | |
| WO | 2018044565 | A1 | | 3/2018 | |
| WO | 2019175702 | A1 | | 9/2019 | |
| WO | 2020003117 | A1 | | 1/2020 | |
| WO | WO-2020003245 | A1 | * | 1/2020 | ........... G02B 6/3853 |
| WO | 2021038497 | A1 | | 3/2021 | |

* cited by examiner 400
30a
31a
34a
39a
200b
38b
200a
220b
39a
39b
Mating Direction
203a
38a
38b
30b 400
30a
31a
34a
200b
38b
200a
39b
39a
39b
220b
Mating Direction
203a
38a
30b
38b

MOLDED OPTICAL CONNECTORS WITH ZERO-DRAFT MECHANICAL ALIGNMENT FEATURES

CROSS REFERENCE TO RELATED APPLICATIONS

This application is a national stage filing under 35 U.S.C. 371 of PCT/IB2022/053787, filed Apr. 22, 2022, which claims the benefit of U.S. Provisional Application No. 63/183,668, filed May 4, 2021, the disclosures of which are incorporated by reference in their entireties herein.

SUMMARY

In some aspects of the present description, a molded optical ferrule configured to mate with a mating optical component is provided, the molded optical ferrule including a top surface, a bottom surface, and a plurality of side surfaces joining the top and bottom surfaces. The top surface includes an attachment area for attaching to an optical waveguide and a light redirecting member for receiving light from an optical waveguide attached to the attachment area along a first direction and redirecting the received light along a different second direction. The bottom surface is opposite the top surface and includes an exit window. The top and bottom surfaces define a thickness direction of the molded optical ferrule therebetween, and the light redirected by the light redirecting member exits the optical ferrule through the exit window. The plurality of side surfaces joining the top and bottom surfaces includes a plurality of first side surface portions and a plurality of second side surface portions extending outwardly from the first side surface portions. The plurality of first side surface portions makes a first angle greater than zero degrees with the thickness direction, such that the first angle assists in a removal of the molded optical ferrule from a corresponding mold. The plurality of second side surface portions extending outwardly from the first side surface portions makes a second angle less than the first angle with the thickness direction, such that when the molded optical ferrule mates with the mating optical component, at least some of the second, but not the first, side surface portions contact corresponding side surface portions of the mating optical component.

In some aspects of the present description, a molded optical cradle configured to mate with a mating optical ferrule and configured to align the optical ferrule to an optical device is provided. The cradle includes a top major surface, an opposing bottom major surface, and a recess configured to accept the mating optical ferrule. The top major surface and opposing bottom major surface define a thickness direction of the molded optical cradle therebetween. The recess extends between the first major surface and the second major surface in the thickness direction and includes a plurality of inner side surfaces. Each inner side surface of the plurality of inner side surfaces includes a plurality of first side surface portions making a first angle greater than zero degrees with the thickness direction and a plurality of second side surface portions extending outwardly from the first side surface portions and making a second angle less than the first angle with the thickness direction. The first angle is such that it assists in a removal of the molded optical cradle from a corresponding mold. When the molded optical cradle is mated with the mating optical ferrule, at least some of the second, but not the first, side surface portions contact corresponding side surface portions of the mating optical ferrule.

In some aspects of the present description, an optical assembly is provided, the optical assembly including a molded optical ferrule and an optical cradle having a recess configured to accept the optical ferrule therein and to align the optical ferrule to an optical device. The molded optical ferrule includes a top surface, a bottom surface opposite the top surface, and a plurality of side surfaces joining the top and bottom surfaces. The top surface of the molded optical ferrule includes an attachment area for attaching to an optical waveguide and a light redirecting member for receiving light from an optical waveguide attached to the attachment area along a first direction and redirect the received light along a different second direction. The bottom surface of the molded optical ferrule includes an exit window. The top and bottom surfaces define a thickness direction of the optical ferrule therebetween, and the light redirected by the light redirecting member exits the optical ferrule through the exit window. The plurality of side surfaces joining the top and bottom surfaces includes a plurality of first side surface portions making a first angle greater than zero degrees with the thickness direction of the molded optical ferrule, and one or more second side surface portions extending outwardly from the first side surface portions and making a second angle less than the first angle with the thickness direction of the molded optical ferrule. The first angle is such that it assists in a removal of the molded optical ferrule from a corresponding mold. The recess of the optical cradle extends between a first major surface and a second major surface of the optical cradle in a thickness direction of the optical cradle and includes a plurality of inner side surfaces. At least some of the second side surface portions of the optical ferrule make contact with the inner side surfaces of the optical cradle when mated.

In some aspects of the present description, an optical assembly is provided, the optical assembly including an optical ferrule and a molded optical cradle. The molded optical cradle includes a recess configured to accept the optical ferrule therein and to align the optical ferrule to an optical device. The optical ferrule includes a top surface, a bottom surface opposite the top surface, and a plurality of side surfaces jointing the top and bottom surfaces. The top surface of the optical ferrule has an attachment area for attaching to an optical waveguide and a light redirecting member for receiving light from an optical waveguide attached to the attachment area along a first direction and redirect the received light along a different second direction. The bottom surface of the optical ferrule includes an exit window. The top and bottom surfaces of the optical ferrule define a thickness direction of the optical ferrule therebetween. The light redirected by the light redirecting member exiting the optical ferrule through the exit window. The recess of the molded optical cradle extends between a first major surface and a second major surface of the optical cradle in a thickness direction of the optical cradle and includes a plurality of inner side surfaces. The inner side surfaces of the molded optical cradle include a plurality of first side surface portions making a first angle greater than zero degrees with the thickness direction of the molded optical cradle, and one or more second side surface portions extending outwardly from the first side surface portions and making a second angle less than the first angle with the thickness direction of the molded optical cradle. The first angle is configured such that it assists in a removal of the molded optical cradle from a corresponding mold. At least some of the second side surface portions of the molded optical cradle make contact with the plurality of side surfaces of the optical ferrule when mated.

In some aspects of the present description, an optical connector assembly is provided, the optical connector assembly including a first optical component and a mating optical component configured to be mated to and held in optical alignment with the first optical component. At least one of the first optical component and the mating optical component is molded and includes a first major surface, an opposing second major surface, a plurality of side surfaces joining the first major surface and the second major surface, and a plurality of alignment features extending outwardly from at least some of the plurality of sides surfaces. The first major surface and second major surface define a thickness direction therebetween. Each side surface of the plurality of side surfaces makes a first angle greater than zero degrees with the thickness direction, and each of the alignment features makes a second angle with the thickness direction less than the first angle. At least some of the alignment features provide contact between the first optical component and the mating optical component, but the plurality of side surfaces do not.

DETAILED DESCRIPTION

Figure 1:
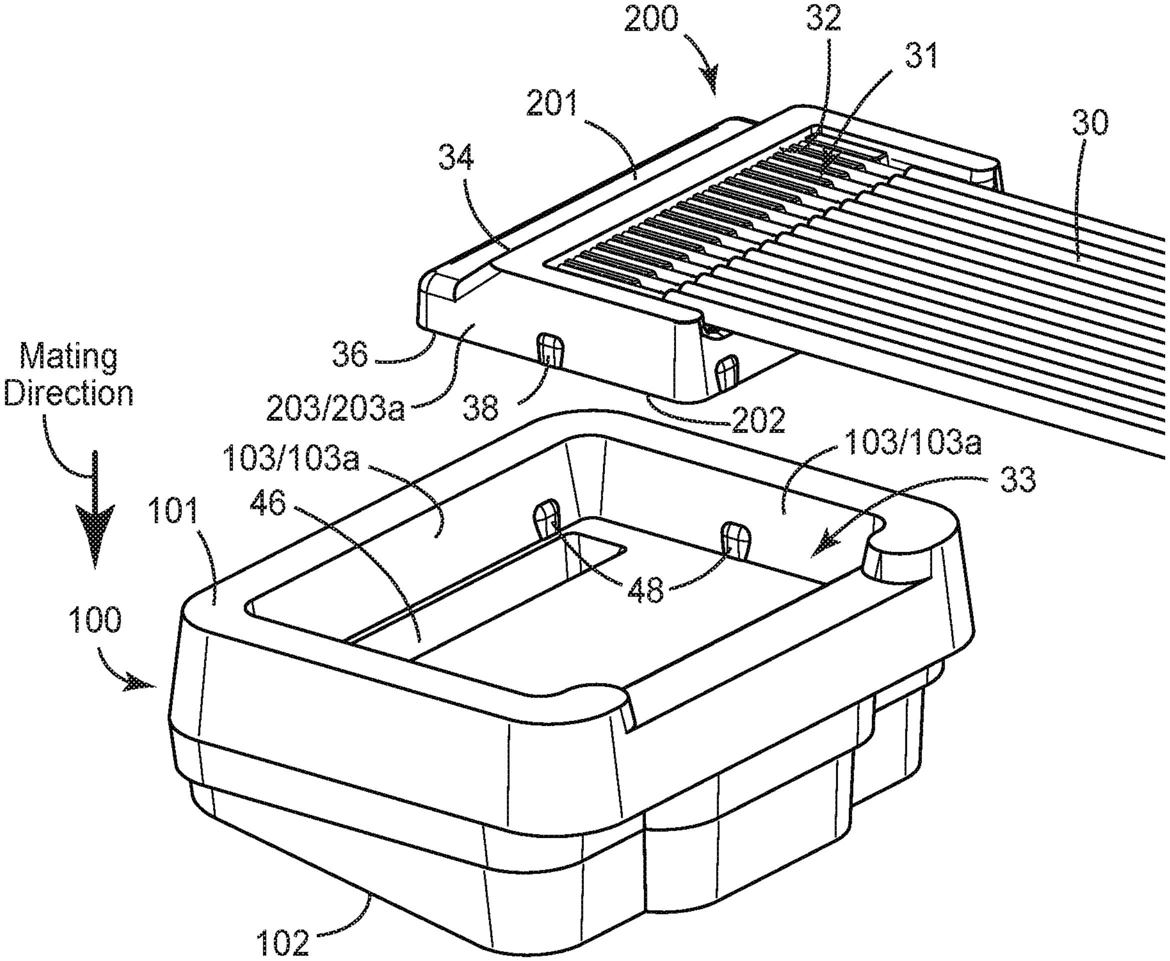
FIG. 1 is a perspective view of an optical connector assembly, in accordance with an embodiment of the present description.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

For injection-molded parts, it is often desirable to have a draft angle (typically 2 degrees or more from the vertical) designed into the part so that it can be readily removed from the mold. However, for certain applications, including the mating of optical connectors which require precise alignment, it is preferable to provide surfaces with an nominal draft angle of zero degrees with the vertical. If the vertical surfaces of mating connectors are all drafted for easy mold removal, the mechanical alignment of two identical, mated connectors, for example, would be limited to edge contact, which may be imprecise and fragile. In certain instances, drafted mating surfaces can cause optical connectors to wedge together (because of the built-in tolerances of the draft angles).

According to some aspects of the present description, the optical connector assemblies of the present description provide a solution to these problems. In some embodiments, components of a molded optical connector assembly may have a plurality of first side surface portions that have a first draft angle configured to assist in removal of the molded parts from a mold (e.g., a draft angle of 2-5 degrees), and a plurality of second side surface portions that are smaller than and extend outwardly from the plurality of first side surface portions, where the plurality of second side surface portions have an intended draft angle of zero degrees. That is, while the side surfaces of the optical component (e.g., an optical ferrule) may generally have a draft angle to facilitate mold removal, small second portions of these side surfaces extend outward from the side surfaces and have an intended draft angle of zero degrees. When mated with a corresponding mating component (e.g., another optical ferrule, or an optical cradle), alignment between the two mating components is provided primarily by the small zero-draft features, not the larger drafted side surfaces. As the zero-draft alignment portions or features are relatively small compared to the larger first side surface portions (e.g., a contact area of the zero-draft portions may be 3% or less of the total area of the first side surface portions), they typically do not cause problems when the component is removed from the mold.

For the purposes of this specification, an "optical ferrule" or simply "ferrule" shall be defined as an optical element for providing optical coupling between an optical waveguide and an optical element such as another optical ferrule, another optical waveguide, or an optical transmitter or receiver. For example, in some embodiments, an optical ferrule may be a mechanical component (e.g., an optical connector) upon which one or more optical fibers is attached. The points of attachment of the one or more optical fibers on the optical ferrule may be positioned relative to precise features on a mating optical component (e.g., a mating optical ferrule, or an optical transceiver) such that when the features are aligned, the fibers are aligned to corresponding optical elements on the mating optical component.

For the purposes of the specification, an "optical cradle" or simple "cradle" shall be defined as a housing for receiving an optical ferrule and facilitating the mounting of the ferrule on a substrate (e.g., a circuit board, or a photonics integrated circuit (PIC)), as well as aligning the optical waveguides attached to the optical ferrule to corresponding features on the substrate. For example, an optical cradle may be a mechanical component which can be accurately aligned and attached relative to one or more optical components (e.g., a PIC, or optical waveguides embedded in a substrate), with precise features designed to interact with those on the matching ferrule. When the precision features on the optical cradle mate with the precision features on the optical ferrule, the fibers on the ferrule are aligned with the optical components attached to the cradle.

According to some aspects of the present description, a molded optical ferrule configured to mate with a mating optical component (e.g., a second optical ferrule, or an optical cradle) includes a top surface, a bottom surface, and a plurality of side surfaces joining the top and bottom surfaces. In some embodiments, the top surface includes an attachment area for attaching to an optical waveguide (e.g., an optical fiber) and a light redirecting member (e.g., a reflective surface) for receiving light from an optical waveguide attached to the attachment area along a first direction and redirecting the received light along a different second direction. In some embodiments, the bottom surface is opposite the top surface and includes an exit window. The top and bottom surfaces define a thickness direction of the molded optical ferrule therebetween, and the light redirected by the light redirecting member exits the optical ferrule through the exit window. In some embodiments, the first direction may be a mating direction of the molded optical ferrule. In some embodiments, the second direction may make an oblique angle with the mating direction of the molded optical ferrule.

In some embodiments, the plurality of side surfaces joining the top and bottom surfaces of the molded optical ferrule includes a plurality of first side surface portions and a plurality of second side surface portions extending outwardly from the first side surface portions. In some embodiments, the plurality of first side surface portions may make a first angle (e.g., a first draft angle) greater than zero degrees with the thickness direction (e.g., 5 degrees), such that the first angle assists in a removal of the molded optical ferrule from a corresponding mold. In some embodiments, the plurality of second side surface portions extending outwardly from the first side surface portions may make a second angle (e.g., a second draft angle) less than the first angle with the thickness direction (e.g., an intended angle of zero degrees). In some embodiments, when the molded optical ferrule mates with the mating optical component, at least some of the second, but not the first, side surface portions contact corresponding side surface portions of the mating optical component.

In some embodiments, each of the second side surface portions may be significantly smaller than the corresponding first side surface portion. That is, the total surface area of the plurality of second side surface portions may be less than about 10%, or less than about 5%, or less than about 3%, of the total surface area of the plurality of first side surface portions. In some embodiments, the maximum dimension of each second side surface portion of the plurality of second side surface portions may be about 200 microns, or about 150 microns, or about 100 microns. In some embodiments, when a second side surface portion is in contact with a corresponding side surface portion of a mating optical ferrule, at least 50% of a surface area of the second side surface portion may be in contact with the corresponding side surface portion of the mating optical ferrule. Stated another way, in some embodiments, the contact between a second side surface portion and the corresponding side surface portion of the mating optical ferrule may be more than just an edge connection.

In some embodiments, the first angle of the plurality of first side surface portions may be greater than or equal to about 1 degree, or about 2 degrees, or about 3 degrees. In some embodiments, the second angle is less than about an intended 2 degrees (or less than about an intended 1.0 degree, or less than about an intended 0.5 degree). In some embodiments, the second angle is an intended 0 degrees.

According to some aspects of the present description, a molded optical cradle configured to mate with a mating optical ferrule and configured to align the optical ferrule to an optical device (e.g., is a photonic integrated circuit, a lens, a grating, a laser diode, a photodiode, etc.) includes a top major surface, an opposing bottom major surface, and a recess configured to accept the mating optical ferrule. In some embodiments, the top major surface and opposing bottom major surface define a thickness direction of the molded optical cradle therebetween. In some embodiments, the recess extends between the first major surface and the second major surface in the thickness direction and includes a plurality of inner side surfaces.

In some embodiments, each inner side surface of the plurality of inner side surfaces may include a plurality of first side surface portions making a first angle greater than zero degrees (e.g., a draft angle of 1 degree or more) with the thickness direction and a plurality of second side surface portions extending outwardly from the first side surface portions and making a second angle less than the first angle with the thickness direction (e.g., an intended zero degree draft angle with the vertical). In some embodiments, the first angle is such that it assists in a removal of the molded optical cradle from a corresponding mold.

When the molded optical cradle is mated with the mating optical ferrule, at least some of the second side surface portions, but not the first side surface portions, contact corresponding side surface portions of the mating optical ferrule. That is, in some embodiments, the second side surface portions may be relatively small mechanical alignment features (relative to the area of the first side surface portions) and may have an intended draft angle of zero degrees to facilitate mechanical alignment with corresponding surfaces in a mating optical component.

According to some aspects of the present description, an optical assembly includes a molded optical ferrule and an optical cradle having a recess configured to accept the optical ferrule therein and to align the optical ferrule to an optical device (e.g., a photonic integrated circuit, a lens, an optical grating, etc.). In some embodiments, the molded optical ferrule includes a top surface, a bottom surface opposite the top surface, and a plurality of side surfaces joining the top and bottom surfaces. In some embodiments, the top surface of the molded optical ferrule may include an attachment area for attaching to an optical waveguide (e.g., one or more optical fibers) and a light redirecting member (e.g., a mirror or reflective surface) for receiving light from an optical waveguide attached to the attachment area along a first direction and redirect the received light along a different second direction. In some embodiments, the bottom surface of the molded optical ferrule may include an exit window. In some embodiments, the top and bottom surfaces may define a thickness direction of the optical ferrule therebetween, and the light redirected by the light redirecting member may exit the optical ferrule through the exit window. In some embodiments, the first direction may be substantially orthogonal to a mating direction of the molded optical ferrule. In some embodiments, the second direction may be at an oblique angle with the mating direction of the molded optical ferrule.

In some embodiments, the plurality of side surfaces joining the top and bottom surfaces may include a plurality of first side surface portions making a first angle (i.e., a draft angle) greater than zero degrees with the thickness direction of the molded optical ferrule, such that the first angle assists in a removal of the molded optical ferrule from a corresponding mold. In some embodiments, the plurality of side surfaces may further include one or more second side surface portions extending outwardly from the first side surface portions and making a second angle less than the first angle (e.g., an intended angle of zero degrees) with the thickness direction of the molded optical ferrule. In some embodiments, the recess of the optical cradle may extend between a first major surface and a second major surface of the optical cradle in a thickness direction of the optical cradle and may include a plurality of inner side surfaces. In some embodiments, at least some of the second side surface portions of the optical ferrule make contact with the inner side surfaces of the optical cradle when mated. In some embodiments, the portions of the inner side surfaces of the optical cradle which come in contact with the second side surface portions may also have an intended draft angle of about zero degrees. In some embodiments, a maximum dimension of each second side surface portion of the one or more second side surface portions may be about 200 microns, or about 150 microns, or about 100 microns.

According to some aspects of the present description, an optical assembly includes an optical ferrule and a molded optical cradle. In some embodiments, the molded optical cradle includes a recess configured to accept the optical ferrule therein and to align the optical ferrule to an optical device (e.g., a photonic integrated circuit, a lens, an optical grating, etc.). In some embodiments, the optical ferrule includes a top surface, a bottom surface opposite the top surface, and a plurality of side surfaces jointing the top and bottom surfaces. In some embodiments, the top surface of the optical ferrule may have an attachment area for attaching to an optical waveguide (e.g., one or more optical fibers) and a light redirecting member (e.g., a mirror or other reflective surface) for receiving light from an optical waveguide attached to the attachment area along a first direction and redirecting the received light along a different second direction. In some embodiments, the first direction may be substantially parallel to the attached optical waveguide of the optical ferrule. In some embodiments, the second direction may be at an oblique angle to the first direction.

In some embodiments, the bottom surface of the optical ferrule includes an exit window. In some embodiments, the top and bottom surfaces of the optical ferrule may define a thickness direction of the optical ferrule therebetween, and the light redirected by the light redirecting member may exit the optical ferrule through the exit window.

In some embodiments, the recess of the molded optical cradle may extend between a first major surface and a second major surface of the optical cradle in a thickness direction of the optical cradle and may include a plurality of inner side surfaces. In some embodiments, the inner side surfaces of the molded optical cradle may include a plurality of first side surface portions making a first angle greater than zero degrees (e.g., a first draft angle for assisting in removing the molded optical cradle from a corresponding mold) with the thickness direction of the molded optical cradle, and one or more second side surface portions extending outwardly from the first side surface portions and making a second angle less than the first angle (e.g., an intended zero degrees) with the thickness direction of the molded optical cradle. In some embodiments, at least some of the second side surface portions of the molded optical cradle, but none of the first side surface portions, may make contact with the plurality of side surfaces of the optical ferrule when mated.

In some embodiments, a maximum dimension of each second side surface portion of the one or more second side surface portions may be about 200 microns, or about 150 microns, or about 100 microns.

According to some aspects of the present description, an optical connector assembly includes a first optical component and a mating optical component configured to be mated to and held in optical alignment with the first optical component. For example, in some embodiments, one of the first optical component and the mating optical component may be an optical ferrule, and the other of the first optical component and the mating optical component may be an optical cradle. In other embodiments, both the first optical component and the mating optical component may be optical ferrules.

In some embodiments, at least one of the first optical component and the mating optical component may be molded (e.g., injection molded) and may include a first major surface, an opposing second major surface, a plurality of side surfaces joining the first major surface and the second major surface, and a plurality of alignment features extending outwardly from at least some of the plurality of sides surfaces. In some embodiments, the first major surface and second major surface may define a thickness direction therebetween. In some embodiments, each side surface of the plurality of side surfaces may make first angle greater than zero degrees with the thickness direction. In some embodiments, each of the alignment features may make a second angle with the thickness direction less than the first angle (e.g., an intended zero-degree draft angle). In some embodiments, at least some of the alignment features provide contact between the first optical component and the mating optical component, but the plurality of side surfaces do not. In some embodiments, a maximum dimension of each alignment feature may be about 200 microns, or about 150 microns, or about 100 microns. In some embodiments, a total area of contact provided by the alignment features is less than about 5%, or less than about 4%, or less than about 3%, of the total area of the plurality of side surfaces.

There may be additional methods for improving the mechanical alignment of two optical components according to the present description. For example, a mold used in injection molding (e.g., the molding of an optical ferrule) typically has two sides, an "A" side and a "B" side, to allow for removing the molded component from the mold. In previous designs of molds for optical ferrules, for example, the optical elements for the ferrule may be molded in the "A" side and the mechanical alignment features for the ferrule may be molded in the "B" side of the mold. However, this approach can lead to alignment problems because of alignment errors between the "A" and "B" sides of the mold. In some embodiments of the present description, a mold for an optical ferrule (or other optical component) may be configured such that all of the optical elements and the critical mechanical alignment features are in the same side of the mold (e.g., the "A" side), eliminating any loss due to A-B alignment. Examples of this molding process are described in U.S. Pat. No. 10,746,942 to Haase et al. and U.S. Patent Publication No. 2020/0301080 to Haase et al., the contents of which are hereby incorporated by reference in their entirety.

Turning now to the figures, FIG. 1 is a perspective view of an optical connector assembly 300 in an unmated configuration, according to the present description. In some embodiments, optical connector 300 includes an optical ferrule 200 and an optical cradle 100. In some embodiments, one or both of the optical ferrule 200 and optical cradle 100 are molded (e.g., created using an injection molding process). For the purposes of this specification, it will be assumed that both the optical ferrule 200 and optical cradle 100 are molded parts. However, this is not meant to be limiting, as at least one of the components could be non-molded.

In some embodiments, optical ferrule 200 includes a top surface 201, a bottom surface 202, and a plurality of side surfaces 203. In some embodiments, top surface 201 includes attachment area 31 for attaching one or more optical waveguides 30 (e.g., optical fibers, optionally in a ribbon cable). In some embodiments, top surface 201 further includes an input surface 32 for receiving light from optical waveguides 30, and a light redirecting member (e.g., an angled reflective surface) 34 which may receive light from optical waveguide 30 via input surface 32 along a first direction and redirect the light along a different second direction (see FIG. 2A for additional details). In some embodiments, bottom surface 202 includes an exit window 36. Light redirected by light redirecting member 34 along the second direction exits optical ferrule 200 via exit window 36, where it continues into opening 46 in optical cradle 100. In some embodiments, opening 46 is aligned to a second set of optical waveguides on a substrate, or other features of an optical component to which the cradle may be attached. In some embodiments, the cradle may also include optical elements, such as lenses or mirrors to focus or otherwise redirect the light (e.g., see lenses in opening 46 shown in FIG. 3).

Figure 2A:
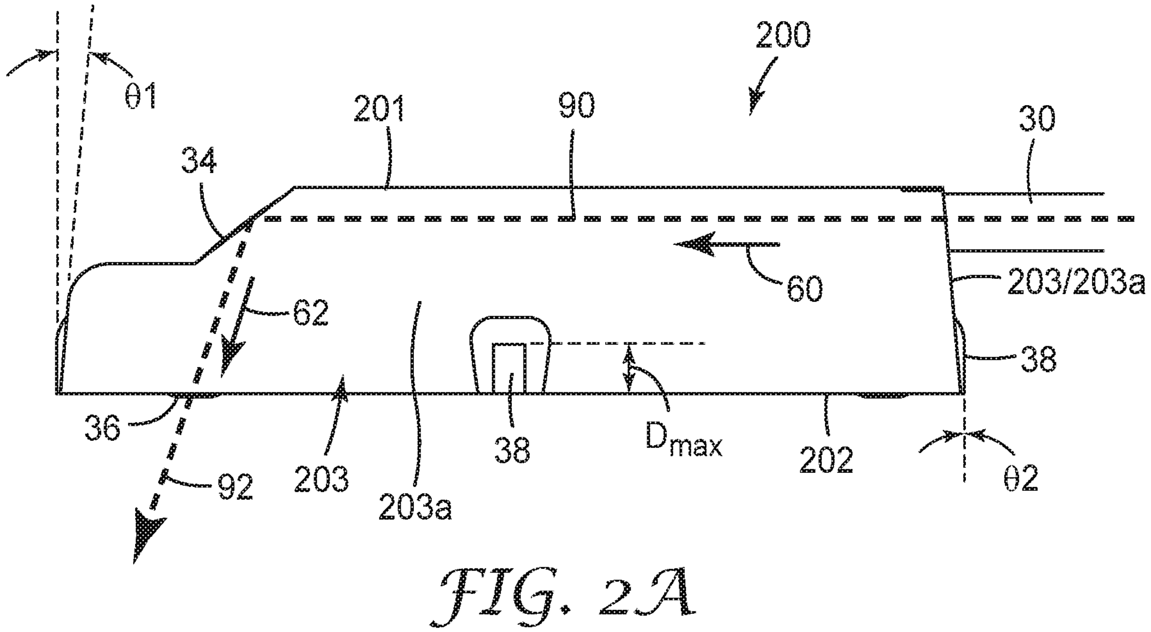
FIGS. 2A-2C provide additional views of the molded optical ferrule and optical cradle of FIG. 1, in accordance with an embodiment of the present description.
Figure 2B:
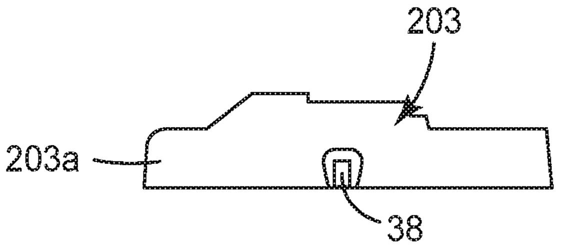
Figure 4A:
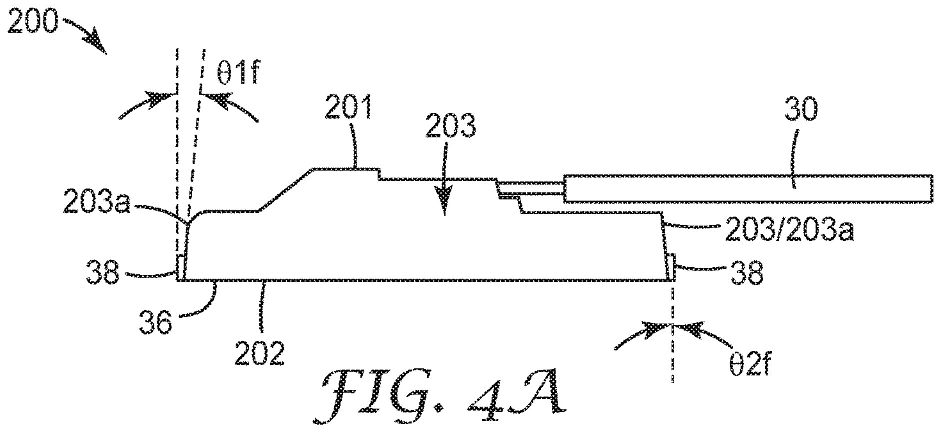
FIGS. 4A-4C show views of a molded optical ferrule and optical cradle showing the mechanical alignment between them, in accordance with an embodiment of the present description.
Figure 4B:
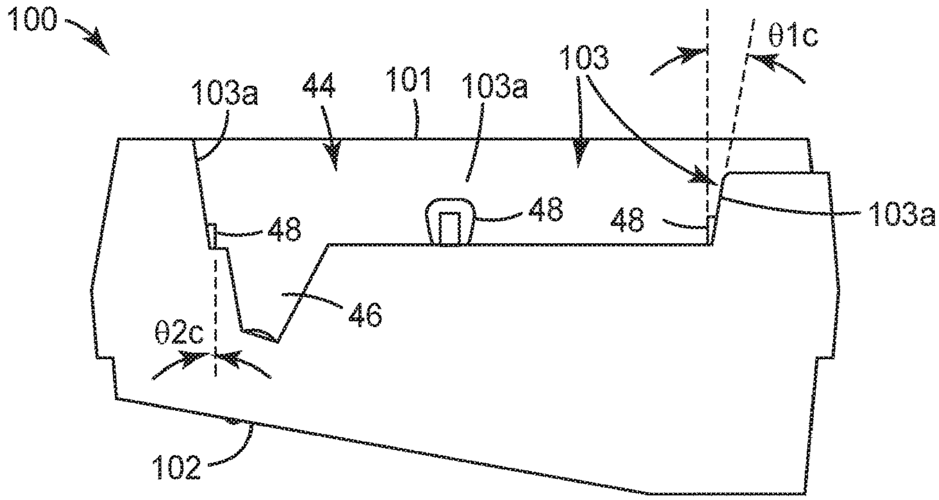

In some embodiments, the plurality of side surfaces 203 may include a plurality of first side surface portions 203*a* and a plurality of second side surface portions 38 (see also FIG. 2B for additional detail). In some embodiments, second side surface portions 38 extend outwardly from the first side surface portions 203*a*. In some embodiments, the plurality of first side surface portions 203*a* make a first draft angle with the vertical, and the plurality of second side surface portions 38 make a second draft angle with the vertical. In some embodiments, the second draft angle is less than the first draft angle (example angles for the surface portions of the optical ferrule 200 and optical cradle 100 are shown in FIGS. 4A and 4B, respectively).

In some embodiments, optical cradle 100 includes a top major surface 101, a bottom major surface 102, and a recess 44 configured to accept mating optical ferrule 200. The recess 44 extends from the first major surface 101 toward the bottom major surface 102 and includes a plurality of inner side surfaces 103. In some embodiments, the plurality of inner side surfaces 103 may include a plurality of first side surface portions 103*a* and a plurality of second side surface portions 48. The plurality of second side surface portions 48 may extend outwardly (i.e., protrude) from the plurality of first side surface portions 103*a*. In some embodiments, the plurality of first side surface portions 103*a* of optical cradle 100 may make a first draft angle with the vertical, and the plurality of second side surface portions 48 of optical cradle 100 make a second draft angle with the vertical. In some embodiments, the second draft angle is less than the first draft angle (see, for example, FIG. 4B). In the embodiment shown in FIG. 1, the mating direction (shown by arrows) is substantially vertical (i.e., the optical ferrule 200 is lowered into the optical cradle 100 in the mating direction shown).

Figure 2C:
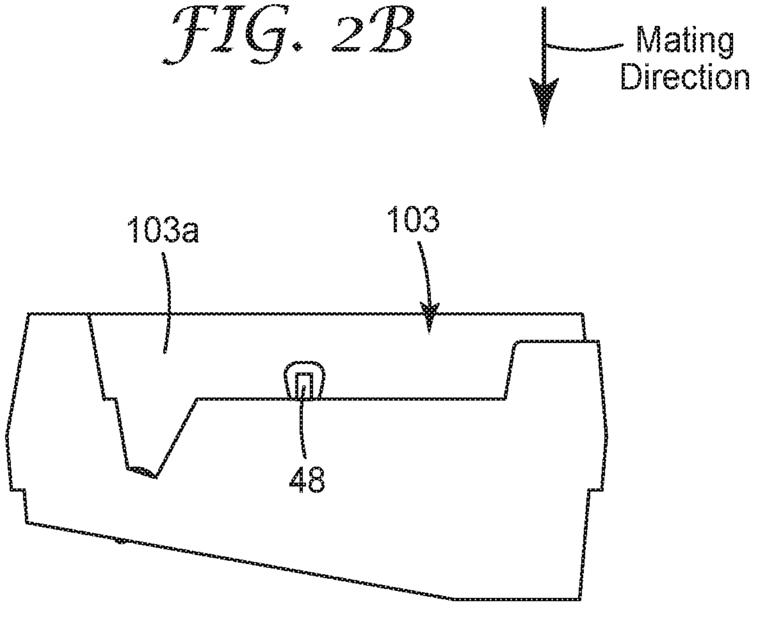

FIGS. 2A-2C provide additional views of the molded optical ferrule and optical cradle of FIG. 1. FIG. 2A is a side view of optical ferrule 200 and shows the path of a light beam 90 through the optical ferrule 200. Light 90 leaves optical waveguide 30 and enters optical ferrule 200 in a first direction 60. In some embodiments, first direction 60 may be substantially orthogonal to a mating direction of optical ferrule 200 (that is, when optical ferrule 200 is mated to an optical cradle, such as shown in FIG. 1, the mating direction may be "down" toward the cradle, as shown in FIGS. 2B and 2C, as it is lowered into the cradle). Light 90 is reflected by light redirecting surface 34 in a different, second direction 62 and becomes reflected light 92. Reflected light 92 leaves optical ferrule 200 via an exit window 36 on the bottom surface 202 of optical ferrule 200. Optical ferrule 200 includes a top surface 201, a bottom surface 202, and a plurality of side surfaces 203 connecting top surface 201 and bottom surface 202. At least some of the plurality of side surfaces 203 include first side surface portions 203*a* and second side surface portions 38. In some embodiments, second side surface portions 38 extend outwardly from first side surface portions 203*a*, forming mechanical alignment features. In some embodiments, first side surface portions 203*a* may make a first angle with the vertical, θ1, which includes a draft angle (e.g., an angle greater than 1 degree with the vertical, or greater than 2 degrees with the vertical, or greater than 3 degrees with the vertical) that assists in the removal of optical ferrule 200 from a corresponding mold. In some embodiments, second side surface portions 38 may make a second angle with the vertical, θ2, that is less than first angle θ1, and may be an intended zero degrees. In some embodiments, second side surface portions 38 may have a maximum dimension, $D_{max}$, which is less than or equal to 200 microns, or less than or equal to 150 microns, or less than or equal to 100 microns. In some embodiments, an area of each of the second side surface portions 38 may be significantly less than a corresponding area of each of the first side surface portions 203*a*. For example, the total area of second side surface portions 38 (i.e., the faces of the second side surface portion 38 may be less than 5%, or less than 4%, or less than 3%, of the total area of the first side surface portions 203*a*).

FIGS. 2B and 2C show a single side surface 203 of an optical ferrule 200 and a single side surface 103 of an optical cradle, respectively, and are provided for clarity. In FIG. 2B, side surface 203 (of optical ferrule 200) includes a larger first side surface portion 203*a* (the larger shaded surface not including feature 38) and a smaller second side surface portion 38. In FIG. 2C, side surface 103 (of optical cradle 100) includes a larger first side surface portion 103*a* (the larger shaded surface not including feature 48) and a smaller second side surface portion 48.

Figure 3A:
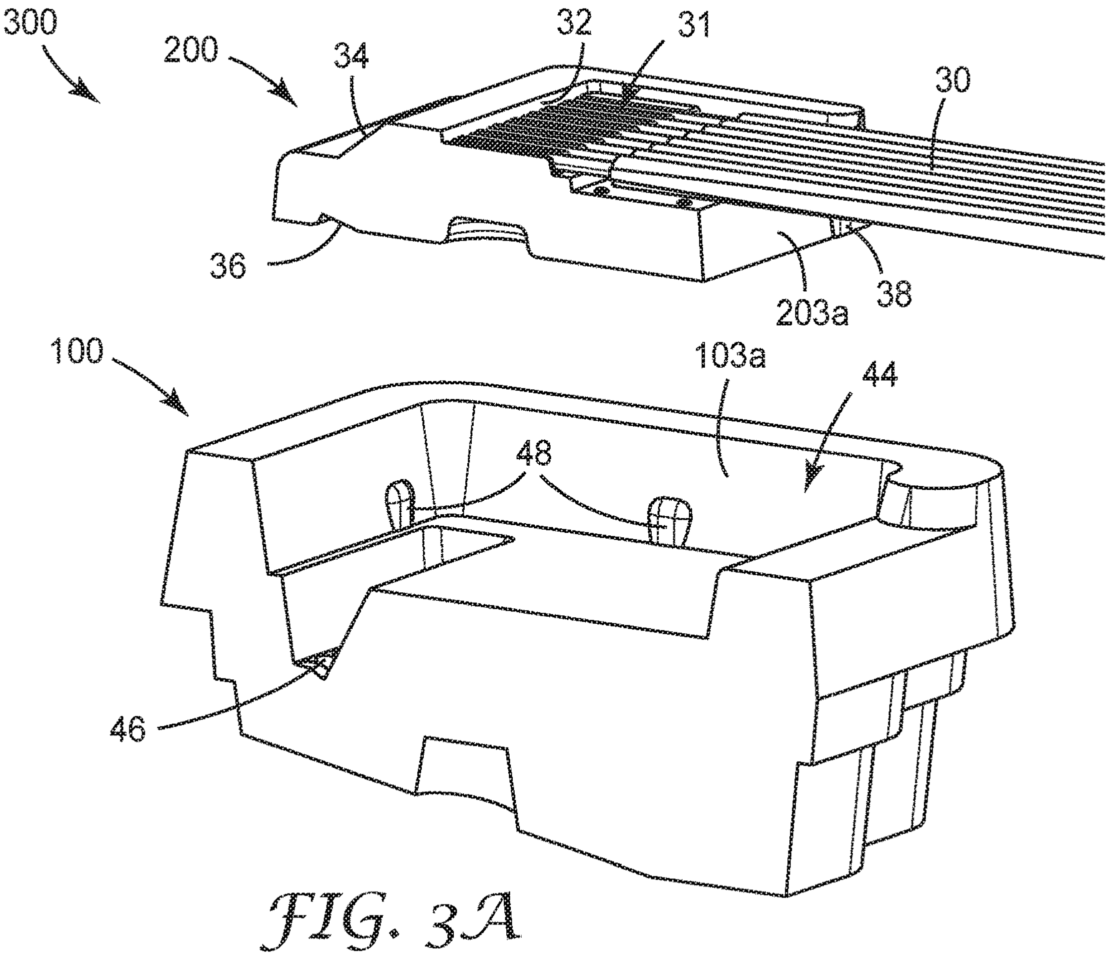
FIGS. 3A and 3B provide cutaway views of an optical connector assembly in both an unmated and mated configuration, in accordance with an embodiment of the present description.
Figure 3B:
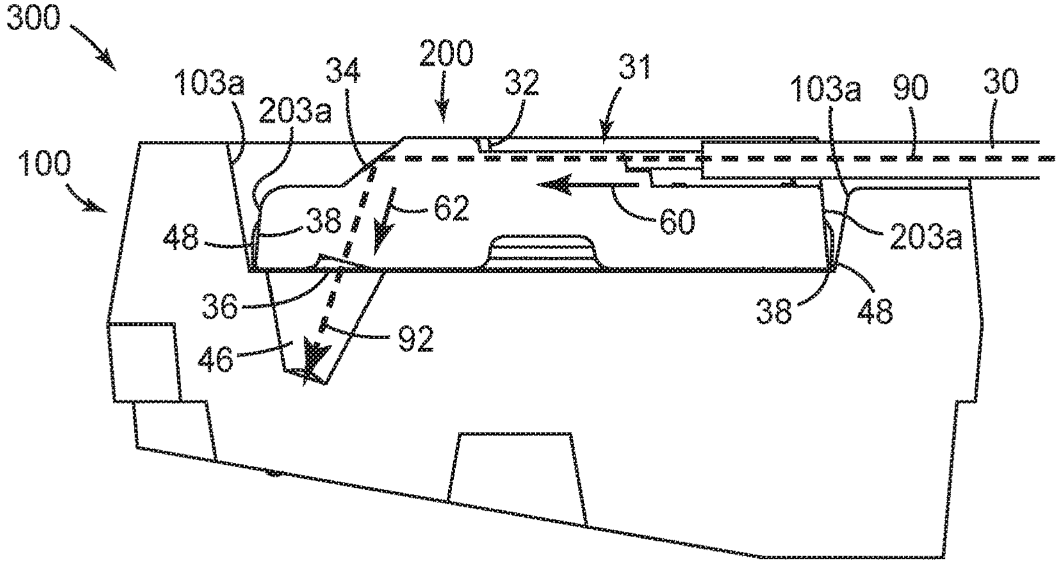

FIGS. 3A and 3B provide cutaway views of an optical connector assembly 300 in both an unmated and mated configuration, respectively. FIG. 3A is similar to the optical connector assembly 300 of FIG. 1 but shows the unmated optical connector assembly 300 in a cutaway view. Elements in FIG. 3A with the same reference numbers as corresponding components elements in FIG. 1 are assumed to have the same function unless otherwise noted. FIG. 3B shows a cutaway view of optical connector assembly 300 in a mated configuration and shows how the reflected light 92 exits optical ferrule 200 through exit window 36 and passes into opening 46 of optical cradle 100. FIG. 3B also shows the physical contact which takes place between at least some of the second side surface portions 38 of optical ferrule 200 and second side surface portions 48 of optical cradle 100. It should be noted that the faces of second side surface portions 38 of optical ferrule 200 and the faces second side surface portions 48 of optical cradle 100 are substantially in contact (i.e., features 38 and 48 are substantially parallel, and the contact between the two set of features is more than just an edge contact). It should also be noted that the opposing draft angles of first side surface portions 203*a* of optical ferrule 200 and the first side surface portions 103*a* prevent them from having anything but, at best, an edge contact between them. Stated another way, the mechanical alignment of optical ferrule 200 and optical cradle 100 is provided substantially by second surface portions 38 and 48, and not by first surface portions 203*a* and 103*a*.

Figure 4C:
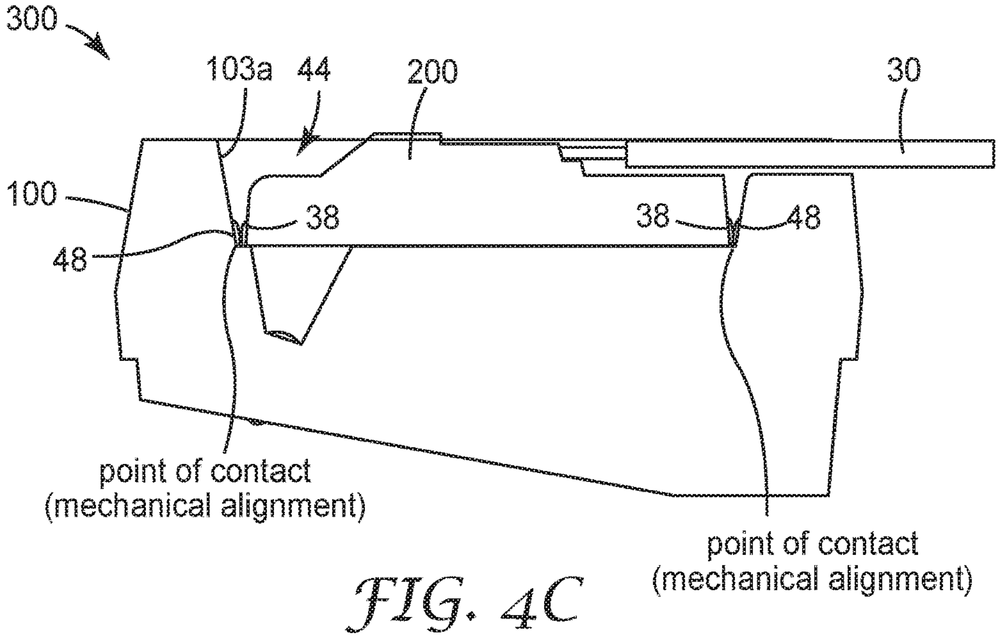

FIGS. 4A-4C show views of an optical ferrule and optical cradle showing the mechanical alignment between them and differing draft angles of the side surfaces, according to the present description. Elements in FIGS. 4A-4C with the same reference numbers as corresponding components elements in any previously numbered figures are assumed to have the same function unless otherwise noted, and the descriptions of these like-numbered elements may not be duplicated here. FIG. 4A shows a side view of an optical ferrule, such as optical ferrule 200 of FIG. 1. Optical ferrule 200 has a top surface 201, a bottom surface 202, and a plurality of side surfaces 203 joining the top 201 and bottom 202 surfaces. The side surfaces 203 include first side surface portions 203*a* and second side surface portions 38. In some embodiments, the first side surface portions 203*a* make a first angle θ1*f* with the vertical, and the second side surface portions 38 make a second angle θ2*f* with the vertical that is less than the first angle. In some embodiments, second side surface portions 38 extend outwardly from the first side surface portions 203*a*, such that, when mated with an optical cradle or a second optical ferrule, only the second side surface portions 38 make contact with the corresponding side surfaces of the mating component (see FIG. 4C, for example).

FIG. 4B shows a side view of an optical cradle, such as optical cradle 100 of FIG. 1. Optical cradle 100 has a top surface 101, a bottom surface 102, a recess 44 for receiving an optical ferrule and including a plurality of inner side surfaces 103. The side surfaces 103 include first side surface portions 103*a* and second side surface portions 48. In some embodiments, the first side surface portions a03*a* make a first angle θ1*c* with the vertical, and the second side surface portions 48 make a second angle θ2*c* with the vertical that is less than the first angle. In some embodiments, second side surface portions 48 extend outwardly (i.e., protrude) from the first side surface portions 103*a*, such that, when mated with an optical ferrule, only the second side surface portions 48 make contact with the corresponding side surfaces of the mating optical ferrule (see FIG. 4C, for example).

FIG. 4C shows the optical ferrule 200 of FIG. 4A mated to the optical cradle 100 of FIG. 4B. When the optical ferrule 200 is placed in recess 44 and fully mated to optical cradle 100, the second side surface portions 38 (of ferrule 200) and second side surface portions 48 (of cradle 100) are the primary points of contact providing mechanical alignment between the ferrule 200 and cradle 100.

Figure 5A:
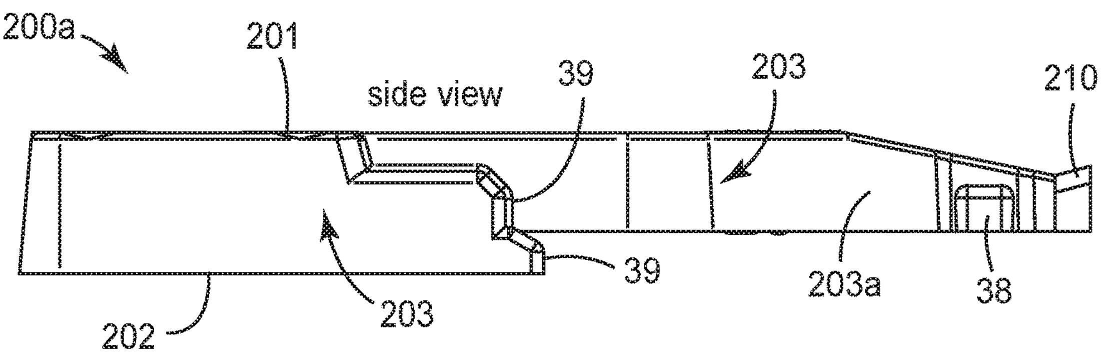
FIGS. 5A-5C show alternate views of a molded optical ferrule, in accordance with an embodiment of the present description.
Figure 5B:
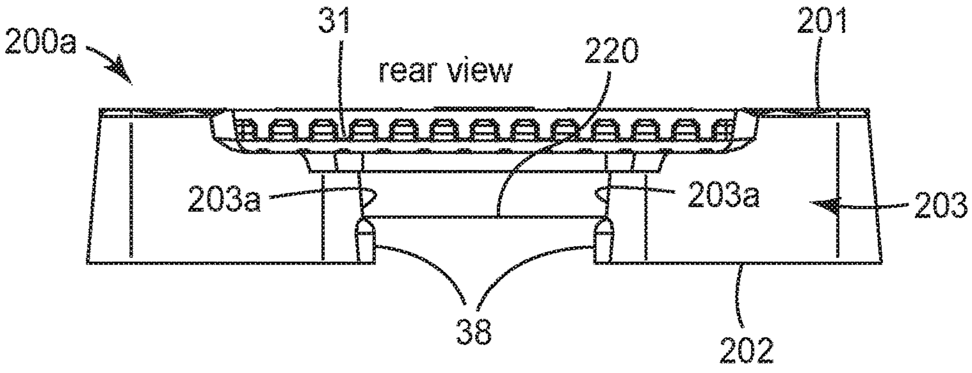
Figure 5C:
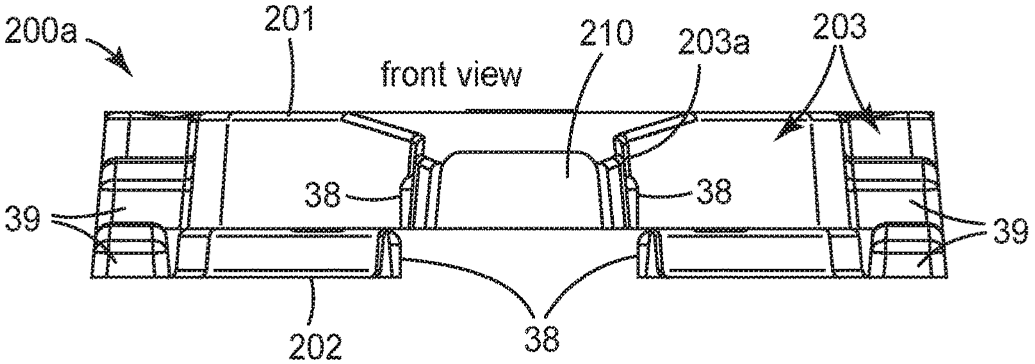

In some embodiments of the present description, an optical connection occurs between two optical ferrules, rather than an optical ferrule and an optical cradle. FIGS. 5A-5C show views of an alternate embodiment of a molded optical ferrule designed to mate with another similar optical ferrule. In the side view of FIG. 5A, molded optical ferrule 200*a* includes a top major surface 201, a bottom major surface 202, and a plurality of side surfaces 203. In some embodiments, at least some of the plurality of side surfaces 203 include a first side surface portion 203*a* and one or more second side surface portions 38 extending outwardly from the first side surface portion 203*a*. In some embodiments, optical ferrule 200*a* includes a front projection 210, designed to fit into a corresponding socket 220 (see FIG. 5B) on an identical mating optical ferrule 200*a*. It is important to note that there may be additional surfaces 39 which serve as forward motion stops which may come in contact with corresponding additional surfaces 39 of a mating optical ferrule when the two optical ferrules are fully mated. In some embodiments, additional surfaces 39 may or may not provide mechanical/optical alignment of the two mated ferrules. In some embodiments, additional surfaces 39 may have an intended draft angle of zero degrees. In other embodiments, additional surfaces 39 may have a slight angle from the vertical, which is matched by additional surfaces 39 of an identical mating ferrule (which would be flipped vertically relative to optical ferrule 200*a* when mating, as shown in FIGS. 6A and 6B).

FIG. 5B is a rear view of optical ferrule 200*a*, providing a view of the mating socket 220 designed to receive the front projection 210 of a mating optical ferrule 200*a*. FIG. 5B also provides a rear view of the attachment area 31 where optical waveguides such as optical fibers may be attached. FIG. 5C is a front view of optical ferrule 200*a*, showing the front projection 210 and front views of forward-facing additional surfaces 39.

Figure 6A:
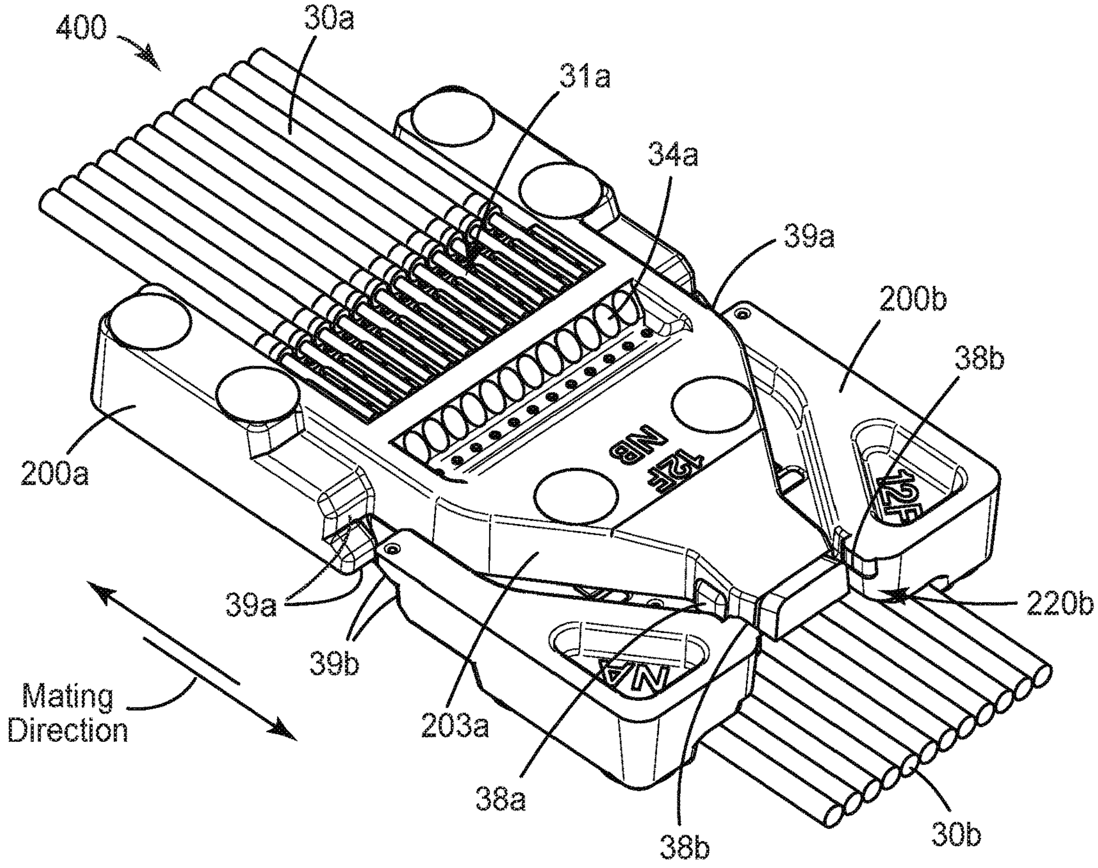
FIGS. 6A-6B show perspective views of a mating optical ferrules in both a nearly mated and mated configuration, in accordance with an embodiment of the present description.
Figure 6B:
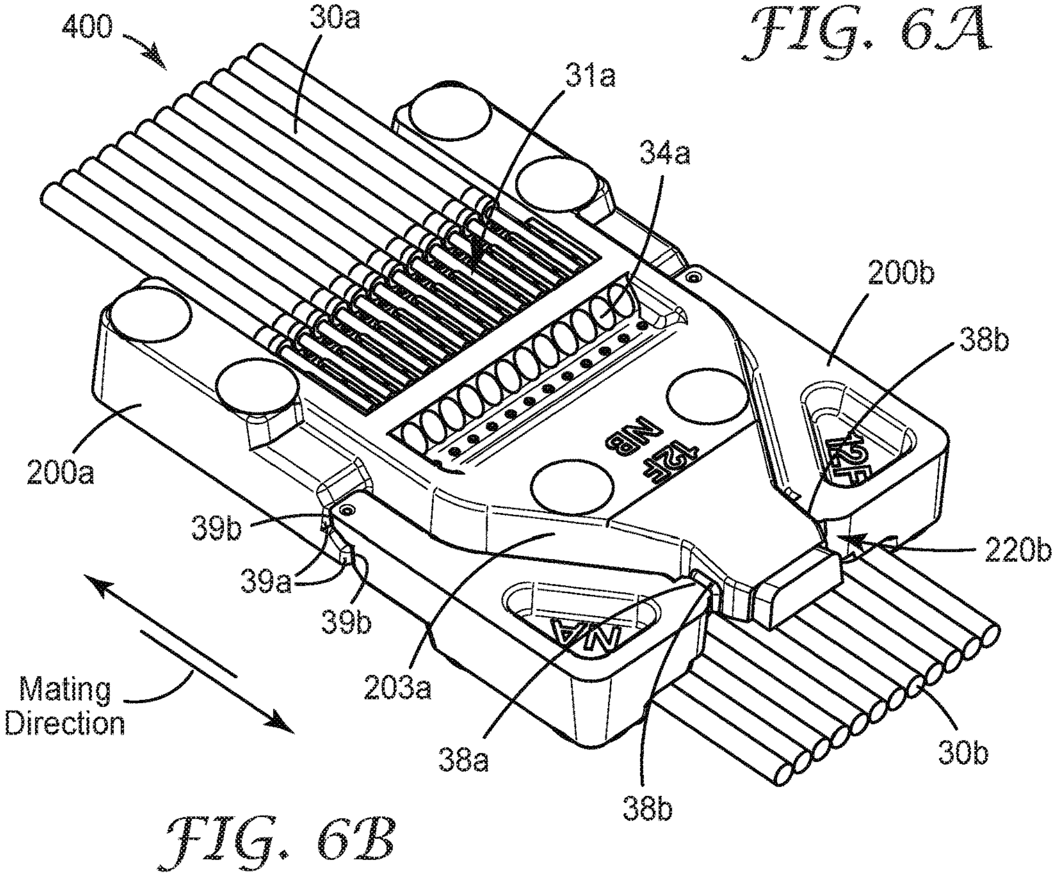

FIGS. 6A-6B show perspective views of an optical assembly 400 including two mating optical ferrules in a nearly mated (FIG. 6A) and mated (FIG. 6B) configuration. The mating optical ferrules shown in FIGS. 6A-6B may be optical ferrules 200*a* of FIGS. 5A-5C, for example, but are labeled 200*a* and 200*b* to more readily distinguish the features of the two separate ferrules. Optical ferrule 200*a* and optical ferrule 200*b* are shown in reverse orientations, with optical ferrule 200*b* flipped "upside down" and with its mating socket 220*b* facing toward the right edge of the figure (i.e., 180 degrees rotated from optical ferrule 200*a*). In the embodiment shown in FIGS. 6A and 6B, the mating direction is substantially parallel to the optical waveguides 30*a* in attachment area 31*a* (as well as optical waveguides 30*b* in attachment area 31*b*, not shown). That is, in the embodiment shown, optical ferrules 200*a* and 200*b* mate by being pushed together in the mating direction shown, such that the front projection 210*a* of optical ferrule 200*a* slides into mating socket 220*b* of optical ferrule 200*b*, and vice versa.

Optical ferrule 200*a* has a plurality of side surfaces 203*a* and a plurality of alignment features 38*a* extending outwardly from at least some of the side surfaces 203*a*. The alignment features 38*a* (also referred to as second side surface portions in previous descriptions herein) are configured to have an intended draft angle of zero degrees, and side surfaces 203*a* have a draft angle greater than the intended draft angle of the alignment features (e.g., greater than about 1 degree, or about 2 degrees, or about 3 degrees), which is configured to assist in the removal of optical ferrule 200*a* from a corresponding mold. Optical ferrule 200*b* (which is substantially identical to optical ferrule 200*a*), has corresponding mating alignment features 38*b*.

FIG. 6A depicts optical ferrule 200*a* and optical ferrule 200*b* in a nearly mated position, in mating position but still separated by a small space (i.e., a gap between additional surfaces 39*a* and additional surfaces 39*b*). FIG. 6B depicts optical ferrule 200*a* and optical ferrule 200*b* in a fully mated position, with additional surfaces 39*a* and additional surfaces 39*b* in contact. When optical ferrule 200*a* and optical ferrule 200*b* are fully mated with alignment features 38*a* and alignment features 38*b* in contact, optical alignment of the ferrules is achieved. That is, light signals passing through optical waveguides 30*a* enter optical ferrule 200*a*, are redirected by the light redirecting surface 34*a* of optical ferrule 200*a* such that they exit optical ferrule 200*a* (via exit window 36*a*, not shown, but similar to exit window 36 of FIG. 1). Upon exiting optical ferrule 200*a*, the light signals will enter optical ferrule 200*b* through a corresponding, identical exit window 36*b* (also not shown) and follow an optical path opposite that described for optical ferrule 200*a*, until the light signals exit optical ferrule 200*b* and pass into optical waveguides 30*b*. It should be noted that the optical path between optical ferrule 200*a* and optical ferrule 200*b* may be bidirectional, such that the two optical ferrules can exchange light signals as required by the application.

Figure 7:
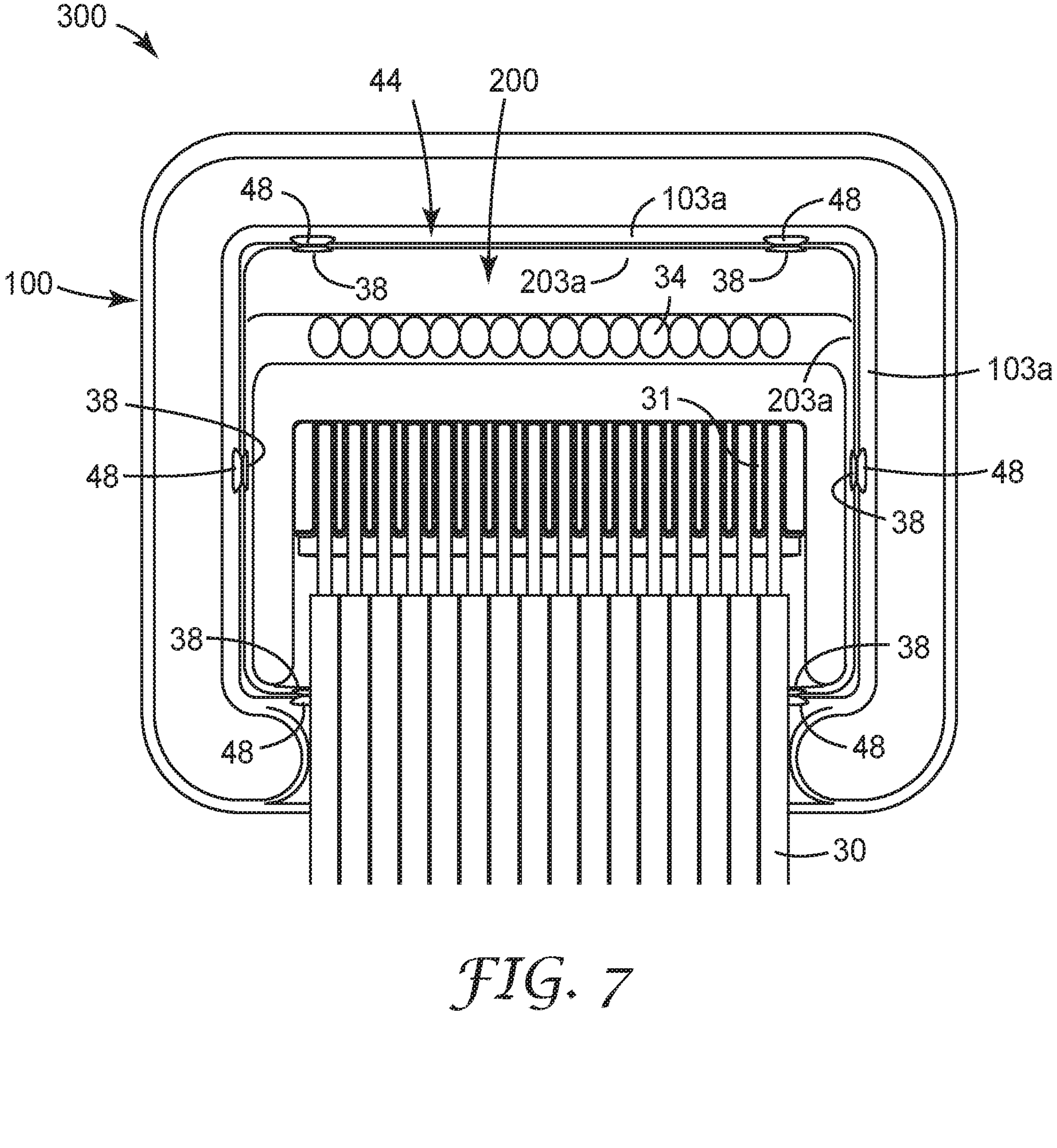
FIG. 7 is a top view of an optical connector assembly, in accordance with an embodiment of the present description.

Finally, FIG. 7 provides a top view of an optical connector assembly 300, such as the optical connector assembly 300 of FIG. 1, in a fully mated position. This view is provided to illustrate the points of contact and mechanical/optical alignment. Optical ferrule 200 is seated completely in recess 44 of optical cradle 100. As can be seen in various points around the perimeter of optical ferrule 200, alignment features (second side surface portions) 38 of optical ferrule 200 are in direct contact with corresponding alignment features (second side surface portions) 48 of optical cradle 100. It should be noted that, in some embodiments, only a subset of alignment features 38 and alignment features 48 may be in contact, as required for optical alignment. For example, built in tolerances may allow optical alignment between ferrule 200 and cradle 100 if only some of the alignment features 38 and 48 are in physical contact. Also, in some embodiments, optical ferrule 200 may have a different number of alignment features 38 compared to the number of alignment features 48 on the optical cradle (e.g., different model numbers with enough matching features to allow proper alignment).

In the embodiment of FIG. 7, mechanical and optical alignment is provided by the contact between ferrule alignment features 38 and cradle alignment features 48. First side surface portions 203*a* of optical ferrule 200 and first side surface portions 103*a* of optical cradle 100 are angled away from each other and do not provide direct surface contact with each other.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A molded optical ferrule configured to mate with a mating optical component and comprising:

- a top surface comprising an attachment area for attaching to an optical waveguide and a light redirecting member for receiving light from the optical waveguide attached to the attachment area along a first direction and redirecting the received light along a different second direction;
- a bottom surface opposite the top surface and comprising an exit window, the top and bottom surfaces defining a thickness direction of the molded optical ferrule therebetween, the light redirected by the light redirecting member exiting the molded optical ferrule through the exit window; and
- a plurality of side surfaces joining the top and bottom surfaces and comprising:
  - a plurality of first side surface portions making a first angle greater than or equal to 1 degree with the thickness direction, the first angle assisting in a removal of the molded optical ferrule from a corresponding mold; and
  - a plurality of second side surface portions, disposed on the plurality of side surfaces and extending outwardly from at least some of the plurality of first side surface portions, each second side surface portion having a second angle of 0 degrees with the thickness direction and a maximum dimension of 200 microns; wherein when the molded optical ferrule mates with the mating optical component, at least some of the second, but not the first, side surface portions are in direct surface-to-surface contact with corresponding side surface portions of the mating optical component, the direct contact covering at least 50% of a surface area of each contacting second side surface portion; and wherein the mating optical component is a molded optical cradle having a recess configured to accept the molded optical ferrule.

2. The molded optical ferrule of claim 1, wherein a maximum dimension of each second side surface portion of the plurality of second side surface portions is 200 microns.

3. The molded optical ferrule of claim 1, wherein at least 50% of a surface area of each of the plurality of second side surface portions is in contact with the corresponding side surface portions of the mating optical component.

4. The molded optical ferrule of claim 1, wherein the mating optical component is a mating optical ferrule.

5. The molded optical ferrule of claim 1, wherein the first angle is greater than or equal to 2 degrees.

6. The molded optical ferrule of claim 1, wherein the second angle is less than 1 degree.

7. The molded optical ferrule of claim 1, wherein the second angle is 0 degrees.

8. A molded optical cradle configured to mate with a mating optical ferrule and configured to align the mating optical ferrule to an optical device, the molded optical cradle comprising:

a top major surface;

an opposing bottom major surface, the top major surface and bottom major surface defining a thickness direction of the molded optical cradle therebetween; and a recess configured to accept the mating optical ferrule, the recess extending between the top major surface and the bottom major surface in the thickness direction and comprising a plurality of inner side surfaces;

each inner side surface of the plurality of inner side surfaces comprising a plurality of first side surface portions making a first angle greater than or equal to 1 degree with the thickness direction, the first angle assisting in a removal of the molded optical cradle from a corresponding mold; and a plurality of second side surface portions disposed on the inner side surface and extending outwardly from at least some of the plurality of first side surface portions, each second side surface portion having a second angle of 0 degrees with the thickness direction and a maximum dimension of 200 microns, such that when the molded optical cradle is mated with the mating optical ferrule, at least some of the second, but none of the first, side surface portions contact corresponding side surface portions of the mating optical ferrule, the contact covering at least 50% of a surface area of each contacting second side surface portion.

9. The molded optical cradle of claim 8, wherein the optical device is a photonic integrated circuit, a lens, or a grating.

10. The molded optical cradle of claim 8, wherein the first angle is greater than or equal to 1 degree.

11. The molded optical cradle of claim 8, wherein the second angle is 0 degrees.

12. An optical assembly comprising:

a molded optical ferrule comprising:

a top surface comprising an attachment area for attaching to an optical waveguide and a light redirecting member for receiving light from the optical waveguide attached to the attachment area along a first direction and redirect the received light along a different second direction;

a bottom surface opposite the top surface and comprising an exit window, the top and bottom surfaces defining a thickness direction of the molded optical ferrule therebetween, the light redirected by the light redirecting member exiting the molded optical ferrule through the exit window; and a plurality of side surfaces joining the top and bottom surfaces and comprising:

a plurality of first side surface portions making a first angle greater than or equal to 1 degree with the thickness direction of the molded optical ferrule, the first angle assisting in a removal of the molded optical ferrule from a corresponding mold; and one or more second side surface portions disposed on the plurality of side surfaces and extending outwardly from at least some of the plurality of first side surface portions, each second side surface portion having a second angle of 0 degrees with the thickness direction of the molded optical ferrule; and an optical cradle comprising a recess configured to accept the molded optical ferrule therein and to align the molded optical ferrule to an optical device, the recess extending between a first major surface and a second major surface of the optical cradle in a thickness direction of the optical cradle and comprising a plurality of inner side surfaces;

wherein at least some of the one or more second side surface portions of the molded optical ferrule make direct surface-to-surface contact with at least some of the plurality of inner side surfaces of the optical cradle when mated, none of the plurality of first side surface portions of the molded optical ferrule contact the plurality of inner side surfaces in the mated state, and the direct contact covers at least 50% of a surface area of each contacting second side surface portion.

13. The optical assembly of claim 12, wherein a maximum dimension of each second side surface portion of the one or more second side surface portions is 200 microns.

14. The optical assembly of claim 12, wherein each of the one or more second side surface portions of the one or more second side surface portions make an angle of 0 degrees with the thickness direction.

15. The optical assembly of claim 12, wherein the optical device is a photonic integrated circuit, a lens, or a grating.

* * * * *